(12) United States Patent
Chen

(10) Patent No.: US 11,476,900 B2
(45) Date of Patent: Oct. 18, 2022

(54) APPARATUS, METHOD AND COMPUTER PROGRAM

(71) Applicant: Nokia Solutions and Networks Oy, Espoo (FI)

(72) Inventor: Chung Shue Chen, Massy (FR)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/280,260

(22) PCT Filed: Oct. 5, 2018

(86) PCT No.: PCT/EP2018/077207
§ 371 (c)(1),
(2) Date: Mar. 26, 2021

(87) PCT Pub. No.: WO2020/069761
PCT Pub. Date: Apr. 9, 2020

(65) Prior Publication Data
US 2022/0045722 A1    Feb. 10, 2022

(51) Int. Cl.
*H04B 7/02*       (2018.01)
*H04B 7/026*      (2017.01)
(Continued)

(52) U.S. Cl.
CPC ........... *H04B 7/026* (2013.01); *H04L 5/0037* (2013.01); *H04L 5/0053* (2013.01); *H04W 52/346* (2013.01)

(58) Field of Classification Search
CPC ..... H04B 7/026; H04L 5/0037; H04L 5/0053; H04W 52/346; H04W 88/04
See application file for complete search history.

(56) References Cited

U.S. PATENT DOCUMENTS

2015/0229133 A1\* 8/2015 Reynolds ................ H02J 7/025
                                                                         307/24
2018/0097670 A1\* 4/2018 Gong ................... H04L 27/2647
(Continued)

OTHER PUBLICATIONS

Nasir, Ali A., et al, "Relaying Protocols for Wireless Energy and Information Processing", © 2013 IEEE, 16 pages.
(Continued)

*Primary Examiner* — Dac V Ha
(74) *Attorney, Agent, or Firm* — Harrington & Smith

(57) ABSTRACT

An apparatus including circuitry configured for: controlling transmission from the apparatus to at least two user equipment within a communications system, wherein the circuitry is further configured for: controlling transmission of data signals for one of the at least two user equipment for a first slot of a direct transmission phase from the apparatus to the at least two user equipment within the communications system, such that: the one of the at least two user equipment is configured to receive and decode the data signals; and at least one other of the at least two user equipment is configured to receive and harvest energy from the data signals for relaying data signals to the one of the at least two user equipment for a cooperative transmission phase; controlling transmission of data signals for both the one of the at least two user equipment and at least one other of the at least two user equipment for a second slot of a direct transmission phase from the apparatus to the at least two user equipment within the communications system.

11 Claims, 11 Drawing Sheets

(51) Int. Cl.
    *H04L 5/00*     (2006.01)
    *H04W 52/34*     (2009.01)

(56) References Cited

U.S. PATENT DOCUMENTS

| | | | |
|---|---|---|---|
| 2018/0234867 A1* | 8/2018 | Wang | H04W 24/08 |
| 2019/0020381 A1* | 1/2019 | Tooher | H04W 72/14 |
| 2019/0044392 A1* | 2/2019 | Chowdhury | H02J 50/12 |
| 2022/0095417 A1* | 3/2022 | Huang | H04B 7/15557 |

OTHER PUBLICATIONS

Gong, Jie, et al., "Non-Orthogonal Multiple Access Systems with Wireless Energy Harvesting", © 2017 IEEE, 6 pgs.

\* cited by examiner

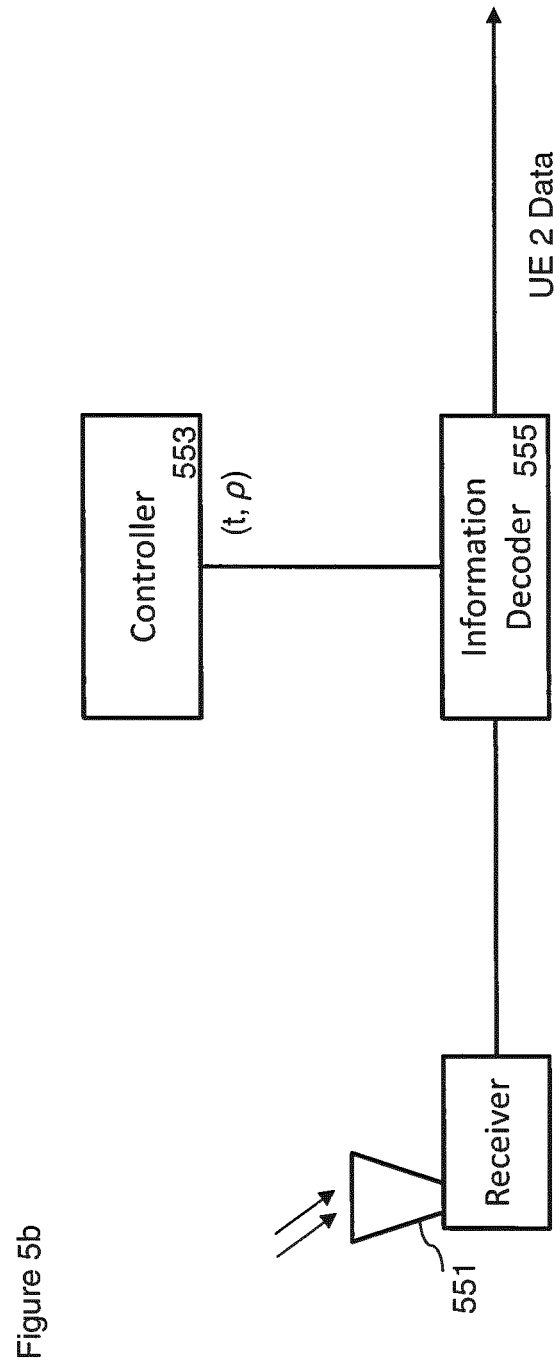

Figure 7

Algorithm 1: Search Algorithm for Generalized Scheme

700 { Input : $h_1, h_2, g, \xi, R_1 = r$
Output: $R_2, t, \rho$

701  Initialize $R_2 = 0$.
702  forall $\rho = 0, \delta\rho, 2\delta\rho, \ldots, 1$ do
703   forall $t = 0, \delta t, 2\delta t, \ldots, 1$ do
704    if $(1-t)\log_2\left(1 + \frac{|h_1|^2(1-\rho)P_T}{\sigma^2}\right) \geq r$ then
705     continue.
706    end
707    Calculate $R_{2,temp}$ according to $t\log_2\left(1 + \frac{|h_2|^2 P_T}{\sigma^2}\right) + (1-t)R_2^{(MRC)}$
708    if $R_{2,temp} > R_2$ then
709     $R_2 = R_{2,temp}$
710    end
711   end
712  end

APPARATUS, METHOD AND COMPUTER PROGRAM

CROSS REFERENCE TO RELATED APPLICATION

This patent application is a U.S. National Stage application of International Patent Application Number PCT/EP2018/077207 filed Oct. 5, 2018, which is hereby incorporated by reference in its entirety.

FIELD

The present application relates to a method, apparatus, system and computer program.

BACKGROUND

A wireless communication system can be seen as a facility that enables communication sessions. The session may be between two or more entities. On one side the entity or entities may be user terminals, machine type devices and/or the like. On the other side, the entity or entities may be an access node such as a base station and/or the like.

In a wireless communication system at least a part of a communication session occurs over a wireless link.

Orthogonal access schemes may be used where resources for different communication devices are not overlapped. Non-orthogonal multiple access (NOMA) allows access by different communication devices in the same resources.

SUMMARY

There is provided according to a first aspect an apparatus comprising means for: controlling transmission from the apparatus to at least two user equipment within a communications system, wherein the means for controlling transmission from the apparatus to at least two user equipment within a communications system is further for: controlling transmission of data signals for one of the at least two user equipment for a first slot of a direct transmission phase from the apparatus to the at least two user equipment within the communications system, such that: the one of the at least two user equipment is configured to receive and decode the data signals; and at least one other of the at least two user equipment is configured to receive and harvest energy from the data signals for relaying data signals to the one of the at least two user equipment for a cooperative transmission phase; controlling transmission of data signals for both the one of the at least two user equipment and at least one other of the at least two user equipment for a second slot of a direct transmission phase from the apparatus to the at least two user equipment within the communications system, such that: the at least one other of the at least two user equipment is configured to receive and split the data signals into two parts: a first part from which the at least one other of the at least two user equipment is configured to harvest energy for relaying data signals to the one of the at least two user equipment; and a second part from which the at least one other of the at least two user equipment is configured to decode data for the at least one other of the at least two user equipment and decode data for relaying in the cooperative transmission phase data signals to the one of the at least two user equipment using the harvested energy.

The means for controlling transmission of data signals for both the one of the at least two user equipment and at least one other of the at least two user equipment may be further for controlling non-orthogonal multiple access transmission of data signals for both the one of the at least two user equipment and at least one other of the at least two user equipment.

The means may be further for obtaining values for the first slot and the second slot of the direct transmission phase, wherein the means for obtaining values for the first slot and the second slot of the direct transmission phase may be further for at least one of: determining a time parameter t for defining a length of the first slot and the second slot of the direct transmission phase based on measured communication pathway parameters between the apparatus, the one of the at least two user equipment and at least one other of the at least two user equipment; determining a portion parameter p for defining the first part from which the at least one other of the at least two user equipment is configured to harvest energy for relaying data signals to the one of the at least two user equipment, and for defining the second part from which the at least one other of the at least two user equipment is configured to decode data for the at least one other of the at least two user equipment and decode data for relaying in the cooperative transmission phase data signals to the one of the at least two user equipment using the harvested energy based on measured communication pathway parameters between the apparatus, the one of the at least two user equipment and at least one other of the at least two user equipment; jointly determining the time parameter and the portion parameter based on measured communication pathway parameters between the apparatus, the one of the at least two user equipment and at least one other of the at least two user equipment; and receiving the time parameter and the portion parameter from a further apparatus.

According to a second aspect there is provided an apparatus comprising means for: receiving, from an access point for a first slot of a direct transmission phase, data signals for a further apparatus: harvesting energy from the data signals for relaying data signals to the further apparatus in a cooperative transmission phase; receiving, from the access point for a second slot of a direct transmission phase, data signals for both the further apparatus and the apparatus; splitting the data signals for both the further apparatus and the apparatus into two parts; harvesting energy from a first part of the two parts of the received data signals for both the further apparatus and the apparatus for relaying data signals to the further apparatus in a cooperative transmission phase; decoding from a second part of the two parts of the received data signals for both the further apparatus and the apparatus data for the apparatus and for the further apparatus; and relaying, in the cooperative transmission phase following the direct transmission phase, to the further apparatus the decoded data for the further apparatus using the harvested energy from the first and second slots.

The means for receiving, from the access point for a second slot of a direct transmission phase, data signals for both the further apparatus and the apparatus may be further for receiving non-orthogonal multiple access signals, and the means for decoding may be further for system interference cancelling the non-orthogonal multiple access signals.

The means may be further for obtaining values for: a time parameter t for defining a length of the first slot and the second slot of the direct transmission phase; and a portion parameter p for defining the first part and the second part of the second slot, wherein the means for obtaining values may be further for at least one of: determining the time parameter t and portion parameter ρ based on measured communication pathway parameters between the apparatus, the further apparatus and an access point; and receiving the time parameter t and portion parameter ρ from an additional apparatus.

The means for determining the a time parameter t and a portion parameter ρ based on measured communication pathway parameters between the apparatus, the further apparatus and an access point may be for jointly determining the time parameter t and portion parameter ρ based on measured communication pathway parameters between the apparatus, the further apparatus and an access point.

A duration of the cooperative transmission phase following the direct transmission phase may be substantially the same as a duration of the second slot of the direct transmission phase.

The means for relaying may be further for relaying the decoded data for the further apparatus using the harvested energy from the first and second slots using an out-of-band channel.

According to a third aspect there is provided an apparatus comprising means for: receiving, from an access point for a first slot of a direct transmission phase, data signals for the apparatus; decoding the first slot of a direct transmission phase data signals; receiving, from the access point for a second slot of a direct transmission phase, data signals for both the apparatus and a further apparatus; receiving, from the further apparatus in a cooperative transmission phase following the direct transmission phase, data signals for the apparatus; combining the data signals for both the apparatus and a further apparatus from the access point and data signals for the apparatus from the further apparatus; and decoding the combined data signals.

The means for receiving, from the access point for a second slot of a direct transmission phase, data signals for both the further apparatus and the apparatus may be further for receiving non-orthogonal multiple access signals, and the means for receiving, from the further apparatus in a cooperative transmission phase following the direct transmission phase, data signals for the apparatus may be further for receiving data signals using an out-of-band channel.

The means may be further for obtaining values for: a time parameter t for defining a length of the first slot and the second slot of the direct transmission phase; and a portion parameter ρ for defining the first part and the second part of the second slot, wherein the means for obtaining values may be further for at least one of: determining the time parameter t and portion parameter ρ based on measured communication pathway parameters between the apparatus, the further apparatus and an access point; and receiving the time parameter t and portion parameter ρ from an additional apparatus.

The means for determining the a time parameter t and a portion parameter ρ based on measured communication pathway parameters between the apparatus, the further apparatus and an access point may be for jointly determining the time parameter t and portion parameter ρ based on measured communication pathway parameters between the apparatus, the further apparatus and an access point.

The means for combining the data signals for both the apparatus and a further apparatus from the access point and data signals for the apparatus from the further apparatus may be further for maximum-ratio combining.

A duration of the cooperative transmission phase following the direct transmission phase may be substantially the same as a duration of the second slot of the direct transmission phase.

According to a fourth aspect there is provided a method comprising: controlling transmission from an apparatus to at least two user equipment within a communications system, wherein controlling transmission from the apparatus to at least two user equipment within a communications system further comprises: controlling transmission of data signals for one of the at least two user equipment for a first slot of a direct transmission phase from the apparatus to the at least two user equipment within the communications system, such that: the one of the at least two user equipment is configured to receive and decode the data signals; and at least one other of the at least two user equipment is configured to receive and harvest energy from the data signals for relaying data signals to the one of the at least two user equipment for a cooperative transmission phase; controlling transmission of data signals for both the one of the at least two user equipment and at least one other of the at least two user equipment for a second slot of a direct transmission phase from the apparatus to the at least two user equipment within the communications system, such that: the at least one other of the at least two user equipment is configured to receive and split the data signals into two parts: a first part from which the at least one other of the at least two user equipment is configured to harvest energy for relaying data signals to the one of the at least two user equipment; and a second part from which the at least one other of the at least two user equipment is configured to decode data for the at least one other of the at least two user equipment and decode data for relaying in the cooperative transmission phase data signals to the one of the at least two user equipment using the harvested energy.

Controlling transmission of data signals for both the one of the at least two user equipment and at least one other of the at least two user equipment may further comprise controlling non-orthogonal multiple access transmission of data signals for both the one of the at least two user equipment and at least one other of the at least two user equipment.

The method may further comprise obtaining values for the first slot and the second slot of the direct transmission phase, wherein obtaining values for the first slot and the second slot of the direct transmission phase may further comprise at least one of: determining a time parameter t for defining a length of the first slot and the second slot of the direct transmission phase based on measured communication pathway parameters between the apparatus, the one of the at least two user equipment and at least one other of the at least two user equipment; determining a portion parameter ρ for defining the first part from which the at least one other of the at least two user equipment is configured to harvest energy for relaying data signals to the one of the at least two user equipment, and for defining the second part from which the at least one other of the at least two user equipment is configured to decode data for the at least one other of the at least two user equipment and decode data for relaying in the cooperative transmission phase data signals to the one of the at least two user equipment using the harvested energy based on measured communication pathway parameters between the apparatus, the one of the at least two user equipment and at least one other of the at least two user equipment; jointly determining the time parameter and the portion parameter based on measured communication pathway parameters between the apparatus, the one of the at least two user equipment and at least one other of the at least two user equipment; and receiving the time parameter and the portion parameter from a further apparatus.

According to a fifth aspect there is provided a method comprising: receiving, at an apparatus from an access point for a first slot of a direct transmission phase, data signals for a further apparatus: harvesting energy from the data signals for relaying data signals to the further apparatus in a cooperative transmission phase; receiving, from the access point for a second slot of a direct transmission phase, data signals for both the further apparatus and the apparatus; splitting the data signals for both the further apparatus and the apparatus into two parts; harvesting energy from a first part of the two parts of the received data signals for both the further apparatus and the apparatus for relaying data signals to the further apparatus in a cooperative transmission phase; decoding from a second part of the two parts of the received data signals for both the further apparatus and the apparatus data for the apparatus and for the further apparatus; and relaying, in the cooperative transmission phase following the direct transmission phase, to the further apparatus the decoded data for the further apparatus using the harvested energy from the first and second slots.

Receiving, from the access point for a second slot of a direct transmission phase, data signals for both the further apparatus and the apparatus may further comprise receiving non-orthogonal multiple access signals, and decoding may further comprise system interference cancelling the non-orthogonal multiple access signals.

The method may further comprise obtaining values for: a time parameter t for defining a length of the first slot and the second slot of the direct transmission phase; and a portion parameter ρ for defining the first part and the second part of the second slot, wherein obtaining values may further comprise at least one of: determining the time parameter t and portion parameter ρ based on measured communication pathway parameters between the apparatus, the further apparatus and an access point; and receiving the time parameter t and portion parameter ρ from an additional apparatus.

Determining the a time parameter t and a portion parameter ρ based on measured communication pathway parameters between the apparatus, the further apparatus and an access point may further comprise jointly determining the time parameter t and portion parameter ρ based on measured communication pathway parameters between the apparatus, the further apparatus and an access point.

A duration of the cooperative transmission phase following the direct transmission phase may be substantially the same as a duration of the second slot of the direct transmission phase.

Relaying may further comprise relaying the decoded data for the further apparatus using the harvested energy from the first and second slots using an out-of-band channel.

According to a sixth aspect there is provided a method comprising: receiving, at an apparatus from an access point for a first slot of a direct transmission phase, data signals for the apparatus; decoding the first slot of a direct transmission phase data signals; receiving, from the access point for a second slot of a direct transmission phase, data signals for both the apparatus and a further apparatus; receiving, from the further apparatus in a cooperative transmission phase following the direct transmission phase, data signals for the apparatus; combining the data signals for both the apparatus and a further apparatus from the access point and data signals for the apparatus from the further apparatus; and decoding the combined data signals.

Receiving, from the access point for a second slot of a direct transmission phase, data signals for both the further apparatus and the apparatus may further comprise receiving non-orthogonal multiple access signals, and receiving, from the further apparatus in a cooperative transmission phase following the direct transmission phase, data signals for the apparatus may further comprise receiving data signals using an out-of-band channel.

The method may further comprise obtaining values for: a time parameter t for defining a length of the first slot and the second slot of the direct transmission phase; and a portion parameter ρ for defining the first part and the second part of the second slot, wherein obtaining values may further comprise at least one of: determining the time parameter t and portion parameter ρ based on measured communication pathway parameters between the apparatus, the further apparatus and an access point; and receiving the time parameter t and portion parameter ρ from an additional apparatus.

Determining the a time parameter t and a portion parameter ρ based on measured communication pathway parameters between the apparatus, the further apparatus and an access point may further comprise jointly determining the time parameter t and portion parameter ρ based on measured communication pathway parameters between the apparatus, the further apparatus and an access point.

Combining the data signals for both the apparatus and a further apparatus from the access point and data signals for the apparatus from the further apparatus may further comprise maximum-ratio combining.

A duration of the cooperative transmission phase following the direct transmission phase may be substantially the same as a duration of the second slot of the direct transmission phase.

According to a seventh aspect there is provided an apparatus comprising at least one processor and at least one memory including a computer program code, the at least one memory and the computer program code configured to, with the at least one processor, cause the apparatus at least to: control transmission to at least two user equipment within a communications system, wherein the apparatus caused to control transmission from the apparatus to at least two user equipment within a communications system is further caused to: control transmission of data signals for one of the at least two user equipment for a first slot of a direct transmission phase from the apparatus to the at least two user equipment within the communications system, such that: the one of the at least two user equipment is configured to receive and decode the data signals; and at least one other of the at least two user equipment is configured to receive and harvest energy from the data signals for relaying data signals to the one of the at least two user equipment for a cooperative transmission phase; control transmission of data signals for both the one of the at least two user equipment and at least one other of the at least two user equipment for a second slot of a direct transmission phase from the apparatus to the at least two user equipment within the communications system, such that: the at least one other of the at least two user equipment is configured to receive and split the data signals into two parts: a first part from which the at least one other of the at least two user equipment is configured to harvest energy for relaying data signals to the one of the at least two user equipment; and a second part from which the at least one other of the at least two user equipment is configured to decode data for the at least one other of the at least two user equipment and decode data for relaying in the cooperative transmission phase data signals to the one of the at least two user equipment using the harvested energy.

The apparatus caused to control transmission of data signals for both the one of the at least two user equipment and at least one other of the at least two user equipment may further be caused to control non-orthogonal multiple access transmission of data signals for both the one of the at least two user equipment and at least one other of the at least two user equipment.

The apparatus may be further caused to obtain values for the first slot and the second slot of the direct transmission phase, wherein the apparatus caused to obtain values for the first slot and the second slot of the direct transmission phase may further be caused to perform at least one of: determine a time parameter t for defining a length of the first slot and the second slot of the direct transmission phase based on measured communication pathway parameters between the apparatus, the one of the at least two user equipment and at least one other of the at least two user equipment; determine a portion parameter ρ for defining the first part from which the at least one other of the at least two user equipment is configured to harvest energy for relaying data signals to the one of the at least two user equipment, and for defining the second part from which the at least one other of the at least two user equipment is configured to decode data for the at least one other of the at least two user equipment and decode data for relaying in the cooperative transmission phase data signals to the one of the at least two user equipment using the harvested energy based on measured communication pathway parameters between the apparatus, the one of the at least two user equipment and at least one other of the at least two user equipment; jointly determine the time parameter and the portion parameter based on measured communication pathway parameters between the apparatus, the one of the at least two user equipment and at least one other of the at least two user equipment; and receive the time parameter and the portion parameter from a further apparatus.

According to a eighth aspect there is provided an apparatus comprising at least one processor and at least one memory including a computer program code, the at least one memory and the computer program code configured to, with the at least one processor, cause the apparatus at least to: receive, from an access point for a first slot of a direct transmission phase, data signals for a further apparatus: harvesting energy from the data signals for relaying data signals to the further apparatus in a cooperative transmission phase; receive, from the access point for a second slot of a direct transmission phase, data signals for both the further apparatus and the apparatus; split the data signals for both the further apparatus and the apparatus into two parts; harvest energy from a first part of the two parts of the received data signals for both the further apparatus and the apparatus for relaying data signals to the further apparatus in a cooperative transmission phase; decode from a second part of the two parts of the received data signals for both the further apparatus and the apparatus data for the apparatus and for the further apparatus; and relay, in the cooperative transmission phase following the direct transmission phase, to the further apparatus the decoded data for the further apparatus using the harvested energy from the first and second slots.

The apparatus caused to receive, from the access point for a second slot of a direct transmission phase, data signals for both the further apparatus and the apparatus may further be caused to receive non-orthogonal multiple access signals, and the apparatus caused to decode may further be caused to system interference cancel the non-orthogonal multiple access signals.

The apparatus may be further caused to obtain values for: a time parameter t for defining a length of the first slot and the second slot of the direct transmission phase; and a portion parameter ρ for defining the first part and the second part of the second slot, wherein the apparatus caused to obtain values may further be caused to perform at least one of: determine the time parameter t and portion parameter ρ based on measured communication pathway parameters between the apparatus, the further apparatus and an access point; and receive the time parameter t and portion parameter ρ from an additional apparatus.

The apparatus caused to determine the a time parameter t and a portion parameter ρ based on measured communication pathway parameters between the apparatus, the further apparatus and an access point may further be caused to jointly determine the time parameter t and portion parameter ρ based on measured communication pathway parameters between the apparatus, the further apparatus and an access point.

A duration of the cooperative transmission phase following the direct transmission phase may be substantially the same as a duration of the second slot of the direct transmission phase.

The apparatus caused to relay may further be caused to relay the decoded data for the further apparatus using the harvested energy from the first and second slots using an out-of-band channel.

According to a ninth aspect there is provided an apparatus comprising at least one processor and at least one memory including a computer program code, the at least one memory and the computer program code configured to, with the at least one processor, cause the apparatus at least to: receive, from an access point for a first slot of a direct transmission phase, data signals for the apparatus; decode the first slot of a direct transmission phase data signals; receive, from the access point for a second slot of a direct transmission phase, data signals for both the apparatus and a further apparatus; receive, from the further apparatus in a cooperative transmission phase following the direct transmission phase, data signals for the apparatus; combine the data signals for both the apparatus and a further apparatus from the access point and data signals for the apparatus from the further apparatus; and decode the combined data signals.

The apparatus caused to receive, from the access point for a second slot of a direct transmission phase, data signals for both the further apparatus and the apparatus may further be caused to receive non-orthogonal multiple access signals, and the apparatus caused to receive, from the further apparatus in a cooperative transmission phase following the direct transmission phase, data signals for the apparatus may further be caused to receive data signals using an out-of-band channel.

The apparatus may be further caused to obtain values for: a time parameter t for defining a length of the first slot and the second slot of the direct transmission phase; and a portion parameter ρ for defining the first part and the second part of the second slot, wherein the apparatus caused to obtain values may further be caused to perform at least one of: determine the time parameter t and portion parameter ρ based on measured communication pathway parameters between the apparatus, the further apparatus and an access point; and receive the time parameter t and portion parameter ρ from an additional apparatus.

The apparatus caused to determine the a time parameter t and a portion parameter ρ based on measured communication pathway parameters between the apparatus, the further apparatus and an access point may further be caused to jointly determine the time parameter t and portion parameter ρ based on measured communication pathway parameters between the apparatus, the further apparatus and an access point.

The apparatus caused to combine the data signals for both the apparatus and a further apparatus from the access point and data signals for the apparatus from the further apparatus may further be caused to maximum-ratio combine the data signals for both the apparatus and a further apparatus from the access point and data signals for the apparatus from the further apparatus.

A duration of the cooperative transmission phase following the direct transmission phase may be substantially the same as a duration of the second slot of the direct transmission phase.

According to a tenth aspect there is provided a computer program comprising instructions [or a computer readable medium comprising program instructions] for causing an apparatus to perform at least the following: controlling transmission to at least two user equipment within a communications system, wherein controlling transmission from the apparatus to at least two user equipment within a communications system further comprises: controlling transmission of data signals for one of the at least two user equipment for a first slot of a direct transmission phase from the apparatus to the at least two user equipment within the communications system, such that: the one of the at least two user equipment is configured to receive and decode the data signals; and at least one other of the at least two user equipment is configured to receive and harvest energy from the data signals for relaying data signals to the one of the at least two user equipment for a cooperative transmission phase; controlling transmission of data signals for both the one of the at least two user equipment and at least one other of the at least two user equipment for a second slot of a direct transmission phase from the apparatus to the at least two user equipment within the communications system, such that: the at least one other of the at least two user equipment is configured to receive and split the data signals into two parts: a first part from which the at least one other of the at least two user equipment is configured to harvest energy for relaying data signals to the one of the at least two user equipment; and a second part from which the at least one other of the at least two user equipment is configured to decode data for the at least one other of the at least two user equipment and decode data for relaying in the cooperative transmission phase data signals to the one of the at least two user equipment using the harvested energy.

According to an eleventh aspect there is provided a computer program comprising instructions [or a computer readable medium comprising program instructions] for causing an apparatus to perform at least the following: receiving, at an apparatus from an access point for a first slot of a direct transmission phase, data signals for a further apparatus: harvesting energy from the data signals for relaying data signals to the further apparatus in a cooperative transmission phase; receiving, from the access point for a second slot of a direct transmission phase, data signals for both the further apparatus and the apparatus; splitting the data signals for both the further apparatus and the apparatus into two parts; harvesting energy from a first part of the two parts of the received data signals for both the further apparatus and the apparatus for relaying data signals to the further apparatus in a cooperative transmission phase; decoding from a second part of the two parts of the received data signals for both the further apparatus and the apparatus data for the apparatus and for the further apparatus; and relaying, in the cooperative transmission phase following the direct transmission phase, to the further apparatus the decoded data for the further apparatus using the harvested energy from the first and second slots.

According to a twelfth aspect there is provided a computer program comprising instructions [or a computer readable medium comprising program instructions] for causing an apparatus to perform at least the following: receiving, at an apparatus from an access point for a first slot of a direct transmission phase, data signals for the apparatus; decoding the first slot of a direct transmission phase data signals; receiving, from the access point for a second slot of a direct transmission phase, data signals for both the apparatus and a further apparatus; receiving, from the further apparatus in a cooperative transmission phase following the direct transmission phase, data signals for the apparatus; combining the data signals for both the apparatus and a further apparatus from the access point and data signals for the apparatus from the further apparatus; and decoding the combined data signals.

According to a thirteenth aspect there is provided a non-transitory computer readable medium comprising program instructions for causing an apparatus to perform at least the following: controlling transmission to at least two user equipment within a communications system, wherein controlling transmission from the apparatus to at least two user equipment within a communications system further comprises: controlling transmission of data signals for one of the at least two user equipment for a first slot of a direct transmission phase from the apparatus to the at least two user equipment within the communications system, such that: the one of the at least two user equipment is configured to receive and decode the data signals; and at least one other of the at least two user equipment is configured to receive and harvest energy from the data signals for relaying data signals to the one of the at least two user equipment for a cooperative transmission phase; controlling transmission of data signals for both the one of the at least two user equipment and at least one other of the at least two user equipment for a second slot of a direct transmission phase from the apparatus to the at least two user equipment within the communications system, such that: the at least one other of the at least two user equipment is configured to receive and split the data signals into two parts: a first part from which the at least one other of the at least two user equipment is configured to harvest energy for relaying data signals to the one of the at least two user equipment; and a second part from which the at least one other of the at least two user equipment is configured to decode data for the at least one other of the at least two user equipment and decode data for relaying in the cooperative transmission phase data signals to the one of the at least two user equipment using the harvested energy.

According to a fourteenth aspect there is provided a non-transitory computer readable medium comprising program instructions for causing an apparatus to perform at least the following: receiving, at an apparatus from an access point for a first slot of a direct transmission phase, data signals for a further apparatus: harvesting energy from the data signals for relaying data signals to the further apparatus in a cooperative transmission phase; receiving, from the access point for a second slot of a direct transmission phase, data signals for both the further apparatus and the apparatus; splitting the data signals for both the further apparatus and the apparatus into two parts; harvesting energy from a first part of the two parts of the received data signals for both the further apparatus and the apparatus for relaying data signals to the further apparatus in a cooperative transmission phase; decoding from a second part of the two parts of the received data signals for both the further apparatus and the apparatus data for the apparatus and for the further apparatus; and relaying, in the cooperative transmission phase following the direct transmission phase, to the further apparatus the decoded data for the further apparatus using the harvested energy from the first and second slots.

According to a fifteenth aspect there is provided a non-transitory computer readable medium comprising program instructions for causing an apparatus to perform at least the following: receiving, at an apparatus from an access point for a first slot of a direct transmission phase, data signals for the apparatus; decoding the first slot of a direct transmission phase data signals; receiving, from the access point for a second slot of a direct transmission phase, data signals for both the apparatus and a further apparatus; receiving, from the further apparatus in a cooperative transmission phase following the direct transmission phase, data signals for the apparatus; combining the data signals for both the apparatus and a further apparatus from the access point and data signals for the apparatus from the further apparatus; and decoding the combined data signals.

According to a sixteenth aspect there is provided an apparatus comprising: transmission controlling circuitry configured to control transmission to at least two user equipment within a communications system, wherein the transmission controlling circuitry further comprises: data transmission controlling circuitry configured to control transmission of data signals for one of the at least two user equipment for a first slot of a direct transmission phase from the apparatus to the at least two user equipment within the communications system, such that: the one of the at least two user equipment is configured to receive and decode the data signals; and at least one other of the at least two user equipment is configured to receive and harvest energy from the data signals for relaying data signals to the one of the at least two user equipment for a cooperative transmission phase; the data transmission controlling circuitry further configured to control transmission of data signals for both the one of the at least two user equipment and at least one other of the at least two user equipment for a second slot of a direct transmission phase from the apparatus to the at least two user equipment within the communications system, such that: the at least one other of the at least two user equipment is configured to receive and split the data signals into two parts: a first part from which the at least one other of the at least two user equipment is configured to harvest energy for relaying data signals to the one of the at least two user equipment; and a second part from which the at least one other of the at least two user equipment is configured to decode data for the at least one other of the at least two user equipment and decode data for relaying in the cooperative transmission phase data signals to the one of the at least two user equipment using the harvested energy.

According to a seventeenth aspect there is provided an apparatus comprising: receiving circuitry configured to receive, from an access point for a first slot of a direct transmission phase, data signals for a further apparatus; energy harvesting circuitry configured to harvest energy from the data signals for relaying data signals to the further apparatus in a cooperative transmission phase; the receiving circuitry further configured to receive, from the access point for a second slot of a direct transmission phase, data signals for both the further apparatus and the apparatus; splitting circuitry configured to split the data signals for both the further apparatus and the apparatus into two parts; the energy harvesting circuitry further configured to harvest energy from a first part of the two parts of the received data signals for both the further apparatus and the apparatus for relaying data signals to the further apparatus in a cooperative transmission phase; decoding circuitry configured to decode from a second part of the two parts of the received data signals for both the further apparatus and the apparatus data for the apparatus and for the further apparatus; and relaying circuitry configured to relay, in the cooperative transmission phase following the direct transmission phase, to the further apparatus the decoded data for the further apparatus using the harvested energy from the first and second slots.

According to an eighteenth aspect there is provided an apparatus comprising receiving circuitry configured to receive, from an access point for a first slot of a direct transmission phase, data signals for the apparatus; decoding circuitry configured to decode the first slot of a direct transmission phase data signals; the receiving circuitry further configured to receive, from the access point for a second slot of a direct transmission phase, data signals for both the apparatus and a further apparatus; the receiving circuitry further configured to receive, from the further apparatus in a cooperative transmission phase following the direct transmission phase, data signals for the apparatus; combining circuitry configured to combine the data signals for both the apparatus and a further apparatus from the access point and data signals for the apparatus from the further apparatus; and decoding circuitry configured to decode the combined data signals.

According to a nineteenth aspect there is provided a computer readable medium comprising program instructions for causing an apparatus to perform the method as described above.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which:

FIG. 5b shows schematically a second mobile communication device (or user equipment) with respect to some embodiments as shown in FIG. 4;

FIG. 7 shows an algorithmic representation of the method of determining the control parameters according to some embodiments;

EMBODIMENTS OF THE APPLICATION

Before explaining in detail the examples, certain general principles of a wireless communication system and mobile communication devices are briefly explained with reference to FIGS. 1 to 3 to assist in understanding the technology underlying the described examples.

Figure 1:
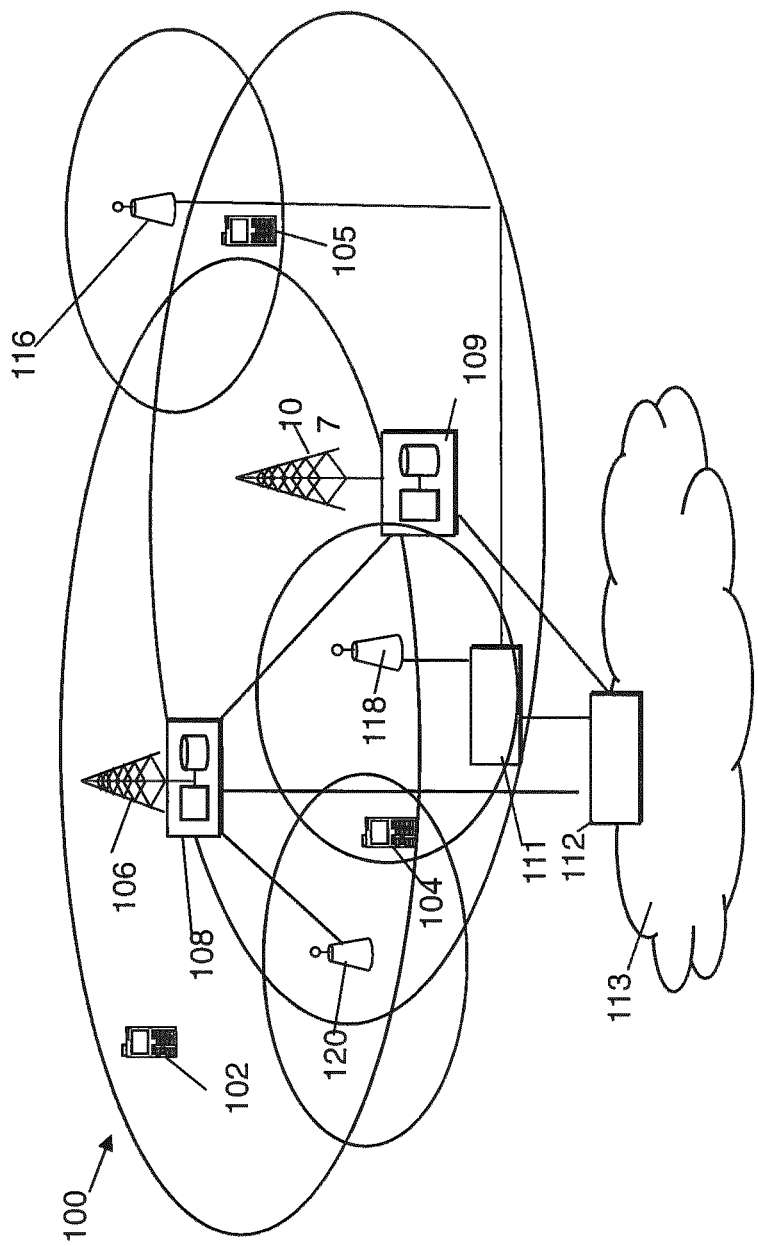
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatuses. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs) and provide E-UTRAN features.

Some embodiments may be provided in the context so call 5G or NR (new radio) network architecture. However, it should be appreciated that this is by way of example and other embodiments may be implemented in the context of other network architectures.

In some communication systems, a basic multiple access scheme is used which is orthogonal for one or both of downlink and uplink data transmissions. This may be referred to as orthogonal multiple access (OMA). This means that resources of different users can be differentiated. The resources may be physical resources such as time and/or frequency which are not overlapped. The signals for different users may alternatively or additionally be differentiated using one or more of the spatial domain and the coding domain.

On the other hand, non-orthogonal multiple-access (NOMA) schemes may alternatively or additionally be used.

For non-orthogonal multiple access, signals from two or more UEs might be transmitted simultaneously in the same resources, e.g., time domain resources and frequency domain resources. There may be interference between transmissions. As the load on a system increases, this non-orthogonal interference characteristic may be more pronounced. To combat the interference between non-orthogonal transmissions, transmitter side schemes such as spreading (linear or non-linear, with or without sparseness) and/or interleaving may be employed. This may improve the performance of the system. Alternatively or additionally, this may ease the burden of advanced receivers.

Non-orthogonal multiple access may be beneficial for grant-free transmission. This may be due to the availability of plenty of NOMA signatures and/or the correspondingly low multiple access (MA) signature collision rate for grant-free transmissions. The NOMA signature may be one or more of a: spreading sequence of a specific spreading factor; a scrambling sequence; and an interleaving pattern.

Non-orthogonal multiple access (NOMA) may have more than one user or communication device served in each orthogonal resource block, e.g., a time slot, a frequency channel, a spreading code, or an orthogonal spatial degree of freedom. NOMA may be advantageous in various use cases or deployment scenarios.

By way of example only, NOMA may be deployed in one or more of enhanced mobile broad band (eMBB), ultra-reliable low latency communication (URLLC) and massive machine type communication (mMTC).

NOMA may use less signalling than OMA. This may result in one or more of: reducing a UE's power consumption; reducing latency; and increasing system capacity.

Figure 2:
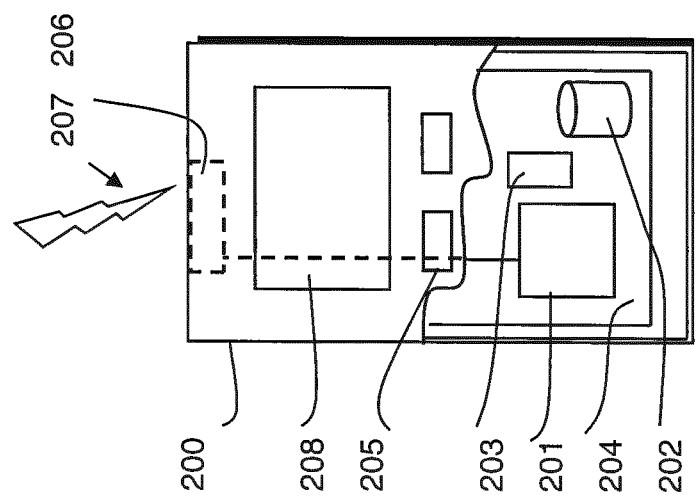
FIG. 2 shows a schematic diagram of an example mobile communication device also known as a user equipment according to some embodiments.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, machine-type communications MTC devices, IoT type communication devices or any combinations of these or the like. The communications may be one or more of voice, electronic mail (email), text message, multimedia, data, machine data, sensor data, etc.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
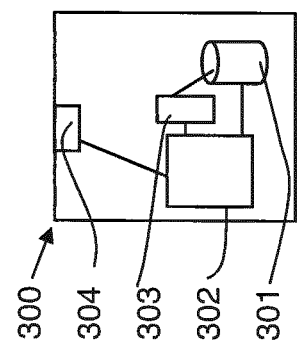
FIG. 3 shows a schematic diagram of an example base station apparatus according to some embodiments.

FIG. 3 shows an example of a control apparatus for an access system, such as a RAN node, e.g. a base station, eNB or gNB, a relay node. The method as discussed herein may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

With the development of the Internet of Things (IoT), big data and many other new technologies, the next generation cellular communication systems are seeing an enormous increase of connected devices. As a consequence, this will lead to planning and organisation challenges for the allocation of limited radio resources in order to cater for the huge number of users. Non-Orthogonal Multiple Access (NOMA) is one of the promising techniques to overcome the problem of resource scarcity.

As mentioned previously in contrast with orthogonal multiple access schemes, NOMA supports simultaneous connections of multiple users with the same channel, and has the advantages of high spectral efficiency, massive connectivity, low latency, and high user fairness. For example, cooperative NOMA has been proposed to take full advantage of the prior information that users with better channel conditions have about other users' messages.

There are envisioned to be many power-constrained nodes within IoT systems which are hard to charge in a conventional manner. These nodes may be located off the power grid and without a suitable long term power source or not able to be serviced. Such nodes may suffer from a short lifespans if, using significant transmission power, they are required to transmit signals to far users. Therefore, energy harvesting has attracted much research attention.

Two practical designs, namely, time switching and power splitting, have been proposed for simultaneous power and information transmission. In power splitting the received signal is split into a first part from which power is generated and a second part from which data is decoded. A power splitting scheme has been applied to cooperative NOMA where it was found that simultaneous wireless information and power transfer (SWIPT) will not jeopardize NOMA's diversity gain, and the benefit of user selection based on node locations was demonstrated.

In time switching the receive time period is divided into two sub-slots. One sub-slot for power transfer only, and one sub-slot for information transmitting only.

The concept as discussed in detail hereafter is a new generalized energy harvesting scheme which is applied to a cooperative NOMA system. In such embodiments an improved far user (or victim user), which in the examples shown herein is detailed as UE 2, achievable rate under a required near user, which in the examples shown herein is detailed as UE 1 achievable rate or quality of service (QoS) requirement.

Furthermore is discussed a method for generating control parameters for optimizing or improving the performance of the system.

The embodiments as discussed herein feature a cooperative Non-Orthogonal Multiple Access (C-NOMA) scheme, where a near user (UE 1) is configured to harvest energy from the signals sent from a suitable access point, for example a base station, and relay a decoded message of far user (UE 2). These embodiments thus feature two energy harvesting schemes, namely power splitting and time switching.

In such embodiments the transmission from the BS can be divided into two phases: a transmission phase (Phase 1) and a cooperative transmission phase (Phase 2).

In the following examples the total time length of direct transmission phase is defined a 1 (in other words normalized). Phase 1 is defined as two time slots, lasting for t and 1−t, respectively. During Phase 1, UE 1 harvests energy only in the first slot (t) and receives both information and energy simultaneously in the second slot (1−t), while UE 2 receives information during the whole phase. In these embodiments since UE 1 has already decoded UE 2's data before decoding its own through successive interference cancellation during Phase 1 (based on a suitable NOMA scheme), the UE 1 then is configured to use the energy harvested to transmit the decoded data to UE 2 during the cooperative transmission phase (Phase 2).

In these examples t is defined as a first tuneable parameter (variable) which can be adjusted in order to attempt to achieve an 'optimal' performance.

Furthermore UE 1 is configured to divides the received power during Phase 1 into two parts, one for energy harvesting, the other for signal decoding, where we denote the proportion of first part by p, and second part by 1−p.

In these examples p is a second tuneable parameter (variable) which can be adjusted for optimal performance.

During Phase 2, UE 1 is configured to relay the decoded message to UE 2. Then UE 2 is configured to combine the signals received in the two phases using a suitable method, for example maximal ratio combining (MRC).

By controlling or tuning t and p, it is possible to configure the system to produce performance which may not be achievable using conventional NOMA energy harvesting.

For example when the channel conditions between the BS and the UE 1, and between the UE 1 and the UE 2 are good, while the channel conditions between the BS and the UE 2 are bad, the proposed scheme has a substantial gain over the conventional NOMA scheme without cooperation.

Furthermore in practice, it often occurs that some devices are blocked by obstacles or under poor channel conditions. One advantage of the proposed scheme is that devices that are not being blocked can serve as relays to help the BS to reach those devices and reduce the probability of user outage.

Furthermore in some embodiments when cooperative transmission is not suitable, the energy harvesting scheme falls back into conventional NOMA, which means the embodiments will not cause unnecessary extra energy consumption and the data rate of UE 1 is not jeopardized.

In other words by employing embodiments, the cooperative transmission and energy harvesting is turned on when necessary and off when not needed.

In such a manner it may be easily applied to the present LTE-A 4G systems and/or future 5G/6G communication systems with good backward compatibility.

Figure 4:
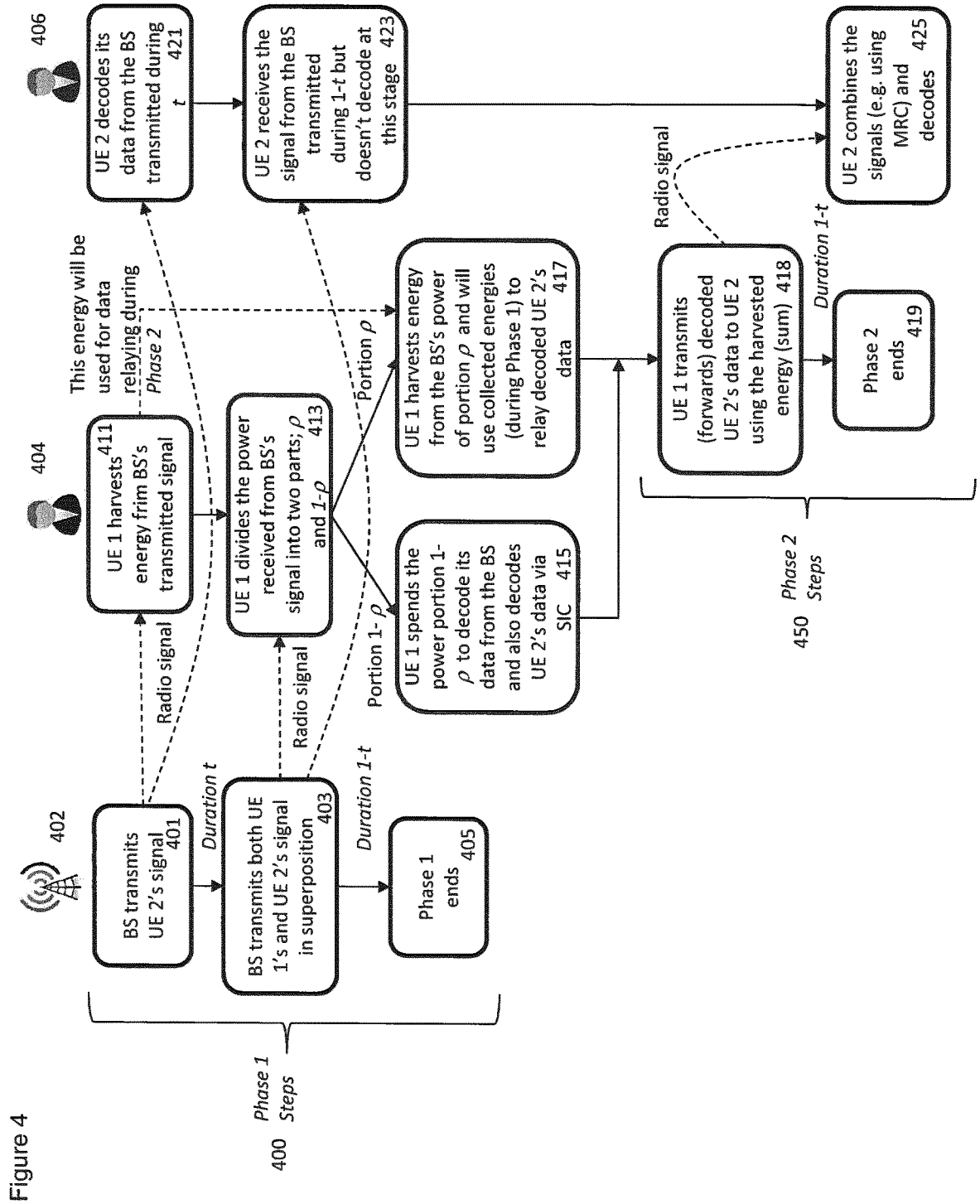
FIG. 4 shows a flow diagram of a method of implementing a communication system according to some embodiments.

With respect to FIG. 4 is shown an example flow diagram showing the downlink transmission implementation of the system according to some embodiments. In this example is shown the access point or base station (BS) 402 which is transmitting to a first mobile communications device, a near UE (UE 1) 404, and a second mobile communications device, a far UE (UE 2) 406. It would be understood that in some embodiments there may be more than two UE in communication with the BS.

In the embodiments shown in FIG. 4, the downlink transmission period is shown comprising two phases. The two phases comprise a first phase 400 which is also known as a direct transmission phase (Phase 1), a second phase 450 which is also known as a cooperative transmission phase (Phase 2).

The direct transmission phase 400 may be defined (normalized) with the total time length of 1.

Within the direct transmission phase 400 the BS is configured to directly transmit to UE 1 and UE 2.

The direct transmission phase 400 (phase 1) comprises two time slots, lasting for t and 1−t, respectively.

With respect to the operations of the base station (BS) 402, the base station 402 is configured to transmit a signal for the UE 2 406 for the duration t (or slot) as shown in FIG. 4 by step 401.

Furthermore the base station 402 is then configured to transmit both a signal for the UE 1 404 and a signal for the UE 2 406 for the duration 1−t (or slot) as shown in FIG. 4 by step 403.

Then phase 1 ends for the base station 402 as shown in FIG. 4 by step 405.

With respect to the near mobile communications device (UE 1) for the duration t of the direct transmission phase 400 the UE 1 404 is configured to harvest energy from the base station transmitted signal as shown in FIG. 4 by step 411. The harvested energy is then going to be used for relaying data in phase 2.

For the following duration 1−t UE 1 404 is then configured to receive the radio signal and divide the power received from the base station transmitted signal into two parts ρ, and 1−ρ as shown in FIG. 4 by step 413.

Furthermore the UE 1 404 is configured to harvest energy from the base station transmitted signal first part p as shown in FIG. 4 by step 417. This harvested energy may then be combined with the harvested energy from the duration t.

The UE 1 404 is also configured to use the second part 1−ρ of the base station transmitted signal for the duration 1−t and decode any data associated with UE 1 404 and furthermore any data associated with UE 2 406. The decoding may be performed using any suitable method, for example, successive interference cancelation (SIC) as shown in FIG. 4 by step 415. The decoded data associated with UE 1 may be processed and the decoded data associated with UE 2 is then passed to a transmitter.

This is the end of phase 1 associated with UE 1 404.

With respect to the far mobile communications device (UE 2) 406 for the duration t of the direct transmission phase 400, the UE 2 406 is configured to decode data associated with the UE 2, from the base station transmitted signal as shown in FIG. 4 by step 421.

For the following duration 1−t UE 2 406 is then configured to receive the radio signal from the base station but does not decode any data from the signal at this time as shown in FIG. 4 by step 423.

This is the end of phase 1 associated with UE 2 406.

With respect to the near mobile communications device (UE 1) 404 for the cooperative transmission phase (Phase 2) 450 the UE 1 404 is configured to transmit (or forward) the data associated with UE 2 406 (decoded during step 415) using the summed harvested energy (harvested by step 411 and 417) as shown in FIG. 4 by step 418. The transmission may be implemented using an out-of-band channel to support the device-to-device (D2D) communication between UE 1 and UE 2. An example of which may be outband D2D.

This is the end of phase 2 associated with UE 2 404 as shown in FIG. 4 by step 419.

With respect to the far mobile communications device (UE 2) 406 for the cooperative transmission phase (Phase 2) 450, the UE 2 406 is configured to receive the transmitted signal from UE 1 404 and combine the signal with the earlier received signal from the base station (received by step 423), for example using maximum-ratio combining (MRC). Having combined the signal the UE 2 406 is configured to decode the data associated with UE 2 406 as shown in FIG. 4 by step 425.

This is the end of phase 2 associated with UE 2 406.

Figure 5A:
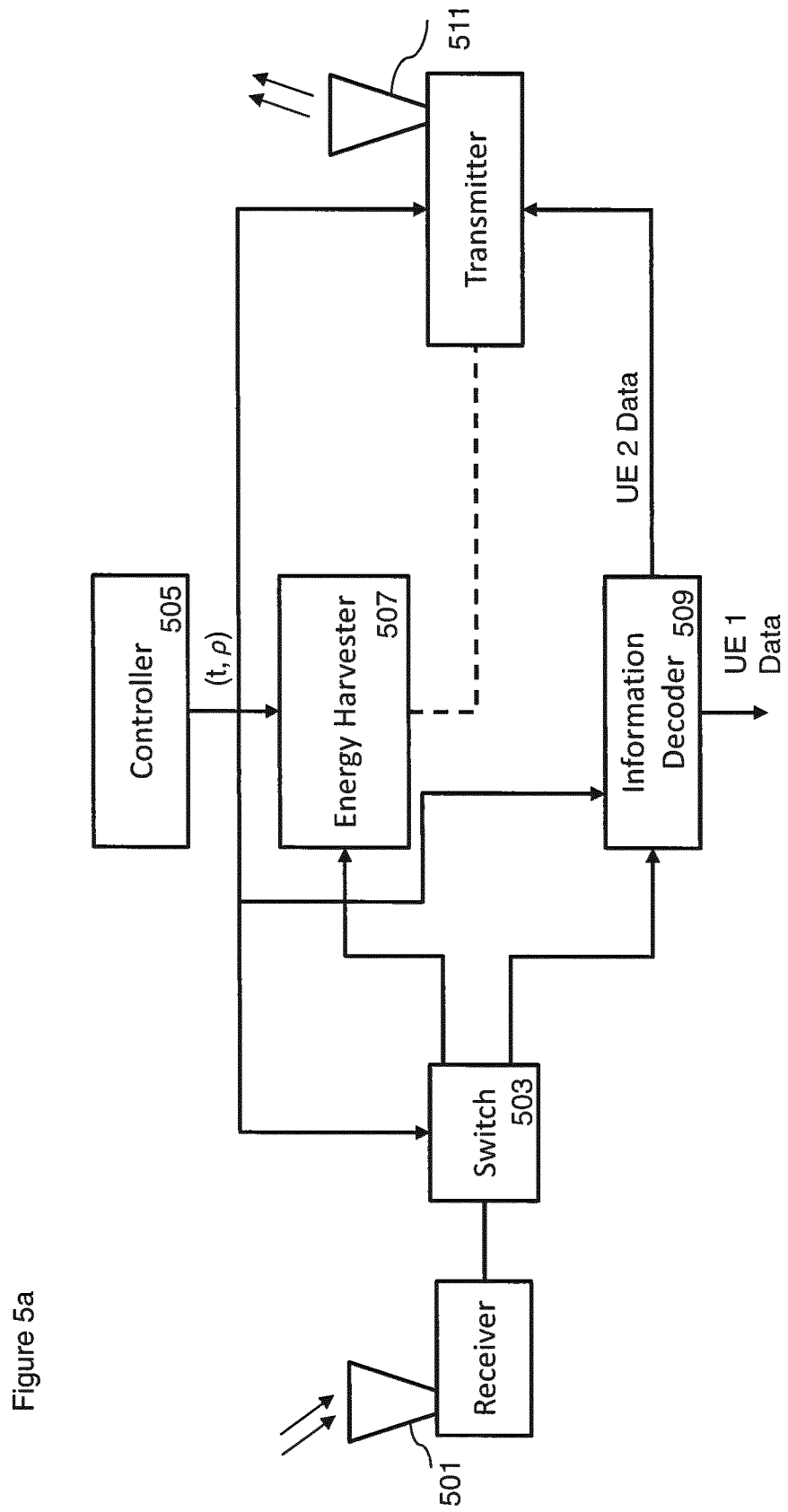
FIG. 5a shows schematically a first mobile communication device (or user equipment) with respect to some embodiments as shown in FIG. 4.

With respect to FIG. 5*a* is shown a schematic representation of an example apparatus suitable for implementing a near mobile communications device UE 1 404.

The UE 1 404 in some embodiments comprises a receiver 501 (or receiver part of a suitable transceiver module) configured to receive the signals transmitted from the base station or any suitable access point. The signals may be passed to a switch 503.

The UE 1 404 in some embodiments further comprises a switch 503. The switch 503 is configured to receive the signals from the receiver 501 and furthermore receive a suitable control signal from a controller 505 indicating the time duration t (and therefore 1−t) and the portion ρ (and therefore 1−ρ) parameters with respect to the direct transmission phase, phase 1. The switch is configured to control the outputting of the signals to an energy harvester 507 and to an information decoder 509 based on the parameters and as discussed herein.

The UE 1 404 in some embodiments further comprises an energy harvester 507. The energy harvester 507 is configured to receive the signals from the switch 503 and furthermore receive a suitable control signal from a controller 505 indicating the time duration t (and therefore 1−t) and the portion ρ (and therefore 1−ρ) parameters with respect to the direct transmission phase, phase 1. The energy harvester 507 is configured to harvest or scrape energy from the received signals and use the energy to power a transmitter 511 as discussed herein.

The UE 1 404 in some embodiments further comprises an information decoder 509. The information decoder 509 is configured to receive the signals from the switch 503 and furthermore receive a suitable control signal from a controller 505 indicating the time duration t (and therefore 1−t) and the portion ρ (and therefore 1−ρ) parameters with respect to the direct transmission phase, phase 1. The information decoder 509 is configured to decode the far mobile communications device UE 2 data and pass this to the transmitter 511 and furthermore to decode the near mobile communications device UE 1 data which may be processed in any suitable manner.

The UE 1 404 in some embodiments further comprises a transmitter 511 (or transmitter part of a suitable transceiver module). The transmitter 511 is configured to receive the decoded data associated with UE 2 from the information decoder 509 and energy from the energy harvester 507 and using this energy transmit the data associated with UE 2 to the UE 2 in the co-operative transmission phase (phase 2) in a manner such as described herein.

The UE 1 404 in some embodiments further comprises a controller 505. The controller 505 is configured to control the switch 503, information decoder 509, energy harvester 507 and transmitter 511 using the control signal from a controller 505 indicating the time duration t (and therefore 1−t) and the portion ρ (and therefore 1−ρ) parameters with respect to the direct transmission phase, phase 1 and during the co-operative transmission phase (phase 2) in a manner such as described herein.

With respect to FIG. 5b is shown a schematic representation of an example apparatus suitable for implementing a far mobile communications device UE 2 406. As can be seen the schematic representation of an example apparatus suitable for implementing a far mobile communications device UE 2 406 is a sub-set of the schematically shown components of the representation of an example apparatus suitable for implementing a near mobile communications device UE 1 404 shown in FIG. 5a. As such it would be understood that a generic mobile communications device may be employed as a near mobile communications device UE 1 404 and/or a far mobile communications device UE 2 406. In such embodiments the generic mobile communications device may be defined as being near or far based on the received signal strength from the access point.

The UE 2 406 in some embodiments comprises a receiver 551 (or receiver part of a suitable transceiver module) configured to receive the signals transmitted from the base station or any suitable access point and from UE 1. The signals may be passed to an information controller 555 (and via in some embodiments a switch not shown for clarity).

The UE 2 406 in some embodiments further comprises an information decoder 555. The information decoder 555 is configured to receive the signals from the receiver 501 and furthermore receive a suitable control signal from a controller 553 indicating the time duration t (and therefore 1−t) and the portion ρ (and therefore 1−ρ) parameters with respect to the direct transmission phase, phase 1. The information decoder 509 is configured to combine the received signals and decode the far mobile communications device UE 2 data as described herein.

The UE 2 406 in some embodiments further comprises a controller 553. The controller 553 is configured to control the information decoder 555 using the control signal indicating the time duration t (and therefore 1−t) and the portion ρ (and therefore 1−ρ) parameters with respect to the direct transmission phase, phase 1 and during the co-operative transmission phase (phase 2) in a manner such as described herein.

In such a manner the UE 1 404 is configured to harvest energy only in the first slot and receives both information and energy simultaneously in the second slot, while UE 2 just receives information during the whole phase. Therefore, during the first slot, the BS transmits signal of UE 2 only, while the superposition of UE 1's and UE 2's signals is transmitted in the second slot. Since UE 1 has already decoded UE 2's data before decoding its own through SIC during Phase 1, it then uses the energy scraped up to transmit the decoded data to UE 2 during cooperative transmission phase (Phase 2).

This can be mathematically summarised as the signal sent by the BS during Phase 1 can be generally denoted by $$\sqrt{P_1^{(1,j)}} x_1 + \sqrt{P_2^{(1,j)}} x_2$$

where $P_1^{(1,j)}$ is the power allocated to UE i in a $j^{th}$ time slot, and the superscript '1' indicates Phase 1 (similar subscripts and superscripts are applied to data rate R, signal-to-noise ratio or signal-to-noise-plus-interference ratio γ too). The maximal transmitted power of the BS is $P_T$ and $x_1$ and $x_2$ are the messages for UE 1 and UE 2, respectively. Then UE i will receive $$y_i^{(1,j)} = h_i \sum_{k \in \{1,2\}} \sqrt{P_k^{(1,j)}} x_k + n_i$$

where $h_i$ denotes the channel link gain from the BS to UE i, and $n_i$ is the additive white Gaussian noise (AWGN) with zero mean and variance $\sigma^2$.

Since in the first slot, only the signal of UE 2 is transmitted, then $P_1^{(1,1)} = 0$ and furthermore $$P_2^{(1,1)} \leq P_T$$

then according to the Shannon-Hartleyh theorem, the instantaneous achievable rate during this time slot, R, is bounded above by $$R_2^{(1,1)} \leq \log_2\left(1 + \frac{|h_2|^2 P_2^{(1,1)}}{\sigma^2}\right)$$

In the second slot, the superposition of both UE 1's and UE 2's signals is transmitted. The power constraint becomes $$P_1^{(1,2)} + P_2^{(1,2)} \leq P_T$$

UE 1 divides the received power $P_1^{(1,2)}$ into two parts, one for energy harvesting, the other for signal decoding. We denote the proportion of first part by $\rho$, and second part by $1-\rho$.

If we assume interference can be totally eliminated by interference cancellation methods such as SIC, the instantaneous achievable rate of UE 1 (the near user) within this time slot is given by $$R_1^{(1,2)} \leq \log_2\left(1 + \frac{|h_1|^2(1-\rho)P_1^{(1,2)}}{\sigma^2}\right)$$

as UE 2 (the far user) views the signals of UE 1 as interfwerence the received SINR at UE 2 is given by $$\gamma_2^{(1,2)} = \frac{|h_2|^2 P_2^{(1,2)}}{|h_2|^2 P_1^{(1,2)} + \sigma^2}$$

The UE 2 does not decode its data at this stage. Instead, it will be decoded after combining with the signals received in Phase 2.

Assuming the energy harvesting efficiency is $\xi$, the energy harvested by UE 1 during Phase 1 is thus given by $$E_H = t\xi|h_1|^2 P_2^{(1,1)} + (1-t)\rho\xi|h_1|^2(P_1^{(1,2)} + P_2^{(1,2)})$$

During Phase 2, UE 1 relays the decoded message $x_k$ to UE 2. Then UE 2 is configured to combine the signals received in the two phases using maximal ratio combining (MRC) or other suitable combining method. In order to do this Phase 2 in some embodiments is as long as the second slot of Phase 1, in other words has the duration $1-t$. (In some embodiments other cooperative transmission and diversity combining schemes may be implemented.) In such embodiments the total power consumption for cooperative transmission $P_C$ should satisfy $$(1-t)P_C \leq E_H$$

where UE 2 observes $$y_2^{(2)} = g\sqrt{P_C}x_2 + n$$

where g is the channel link gain from UE 1 to UE 2. The received SNR at UE 2 during Phase 2 is thus given by $$\gamma_2^{(2)} = \frac{|g|^2 P_C}{\sigma^2} \quad (2)$$

After MRC, the obtained SINR is given by $$\gamma_2^{(MRC)} = \gamma_2^{(2)} + \gamma_2^{(1,2)}$$

and the instantaneous achievable rate within this phase is bounded above as follows:

$$R_2^{(MRC)} \leq \log_2(1 + \gamma_2^{(MRC)})$$

Using the same assumption as above with respect to Phase 1, UE 1 being configured to decode UE 2's message successfully, then the rate may be, $$R_2^{(MRC)} \leq \log_2\left(1 + \frac{|h_1|^2(1-\rho)P_2^{(1,2)}}{|h_1|^2(1-\rho)P_1^{(1,2)} + \sigma^2}\right)$$

The controller may be configured to attempt to determine parameters such that it produces a maximal $R_2^{(MRC)}$ under a certain $R_1$ value.

The optimization problem may be summarised mathematically as:

(P0) max $R_2$ subject to $R_1 = r$, $0 \leq t \leq 1, 0 \leq \rho \leq 1$ where r is the target average rate of UE 1.

UE 1 receives signal only during the second slot of direct transmission phase, therefore $$R_1 = (1-t)R_1^{(1,2)}$$

UE 2's data reception comprises of two parts. The first part is from the BS during the first slot of Phase 1, and the second part is by the MRC of the data from the BS during the second slot of Phase 1, and from UE 1 during Phase 2. Consequently, $$R_2 = tR_2^{(1,1)} + (1-t)R_2^{(MRC)}$$

In the optimisation or determination of the parameters $r > 0$, otherwise, UE 1 is a pure relay node. In this case, we can infer that both t and $\rho$ cannot be 1. From the above $$r = (1-t)R_1^{(1,2)}$$

so $t \neq 1$. Also if $\rho = 1$ then $R_1^{(1,2)} = 0$ which implies $r = 0$ and therefore $\rho \neq 1$. The above optimisation may therefore be rewritten as $$(P1) \max_{t,\rho} t\log_2\left(1 + \frac{|h_2|^2 P_T}{\sigma^2}\right) + (1-t)R_2^{(MRC)}$$

subject to $(1-t)\log_2\left(1 + \frac{|h_1|^2(1-\rho)P_T}{\sigma^2}\right) \geq r$, $0 \leq t \leq 1, 0 \leq \rho \leq 1$ where $$R_2^{(MRC)} = \min\left\{ \begin{array}{l} \log_2\left(1 + \frac{|h_2|^2 P_2^{(1,2)}}{|h_2|^2 P_1^{(1,2)} + \sigma^2} + \frac{\xi|h_1|^2|g|^2 P_T\left(\frac{t}{1-t}+\rho\right)}{\sigma^2}\right), \\ \log_2\left(1 + \frac{|h_1|^2(1-\rho)P_2^{(1,2)}}{|h_1|^2(1-\rho)P_1^{(1,2)} + \sigma^2}\right) \end{array} \right\}$$

$$P_1^{(1,2)} = \frac{\left(2^{\frac{t}{1-t}} - 1\right)\sigma^2}{|h_1|^2(1-\rho)}$$

and $$P_1^{(1,2)} + P_2^{(1,2)} = P_T$$

This problem may be solved by using an exhaustive search algorithm. Since there are only two variables $(t, \rho)$ in the generalized energy harvesting scheme described herein in practice it is fast to find an optimal solution in the above problem. Note that for power splitting scheme and time switching scheme, it is possible to set simply $t = 0$ or $\rho = 0$, respectively.

Figure 6:
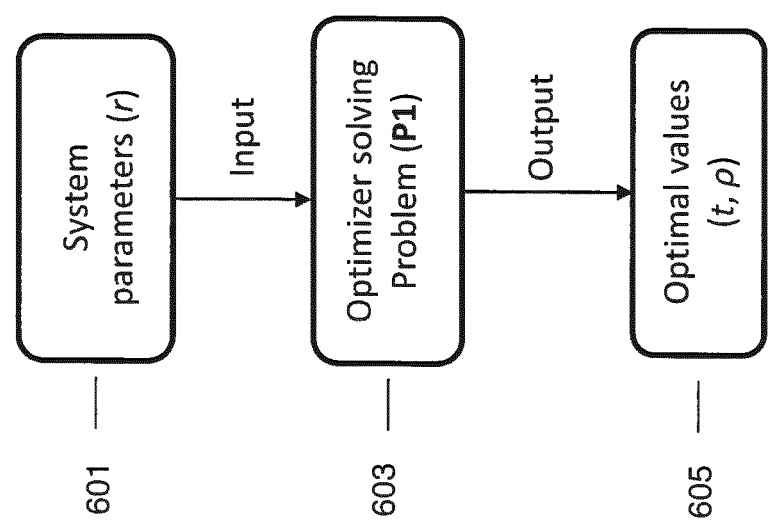
FIG. 6 shows a flow diagram of a method of determining control parameters for controlling the method shown in FIG. 4.

With respect to FIG. 6 a flow diagram of the optimisation problem solution according to some embodiments is shown.

The system parameters r are determined as shown in FIG. 6 by step 601.

Having determined the system parameters an optimiser employed on the problem, such as P1 as defined above as shown in FIG. 6 by step 603.

The output of the optimiser, the parameters t and p are then output and used to control the energy harvesting and data forwarding as indicated above as shown in FIG. 6 by step 605.

With respect to FIG. 7 an example algorithm for the optimiser is shown in further detail.

The first operation 700 of the algorithm is the definition of the inputs $h_1$, $h_2$, $g$, $\zeta$, $R_1=r$ and the outputs $R_2$, $t$, and $\rho$.

The next operation 701 is the initialisation of $R_2=0$.

Then a first loop is initialised 702 for a sequence of stepped values of $\rho$ from 0 to 1, in steps of $\delta\rho$. For example a first loop $\rho=0$, a next loop $\rho=\delta\rho$, then $2\delta\rho$ and so on.

Then a further inner loop is initialised 703 for a sequence of stepped values of t from 0 to 1, in steps of $\delta t$. For example a first loop $t=0$, a next loop $t=\delta t$, then $2\delta t$ and so on.

Within the inner loop a first comparison 704 is performed to determine whether $$(1-t)\log_2\left(1 + \frac{|h_1|^2(1-\rho)P_T}{\sigma^2}\right) \geq r.$$

Where it is then the inner loop continues 705 otherwise the inner loop passes to the next iteration (it ends 706).

The next operation is the calculation of a temporary $R_2$ value according to $$t\log_2\left(1 + \frac{|h_2|^2 P_T}{\sigma^2}\right) + (1-t)R_2^{(MRC)}$$

as shown in step 707.

The next operation is a comparison of the temporary $R_2$ value to the current stored $R_2$ value as shown in step 708.

Where the temporary $R_2$ value is greater than the current stored $R_2$ value then the current stored $R_2$ value is set as the temporary $R_2$ value as shown in step 709.

Otherwise the comparison ends as shown in step 710.

The inner loop repeats (ends) as shown in step 711.

The outer loop repeats (ends) as shown in step 712.

Figure 8:
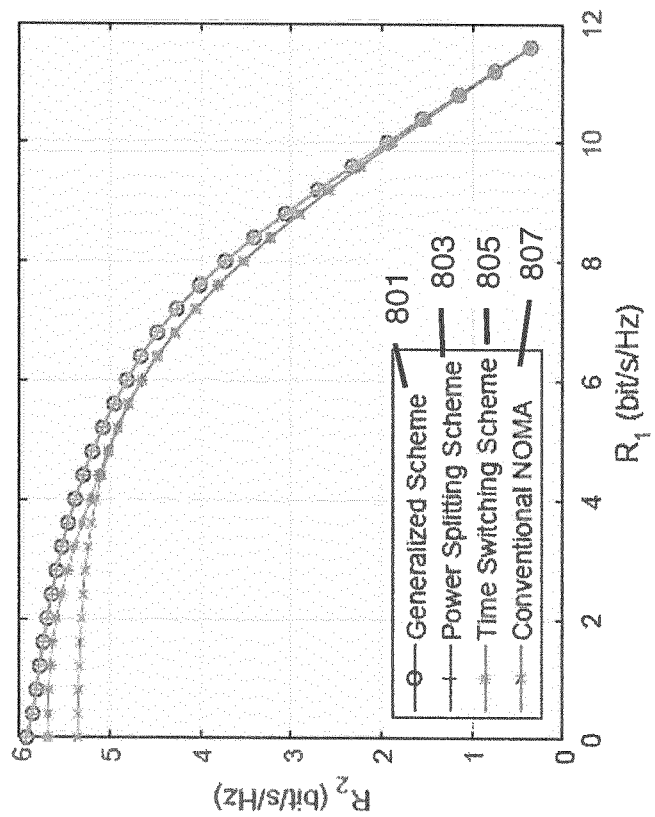
FIGS. 8 to 10 show performance plots based on a simulated communication system implementing some embodiments.
Figure 9:
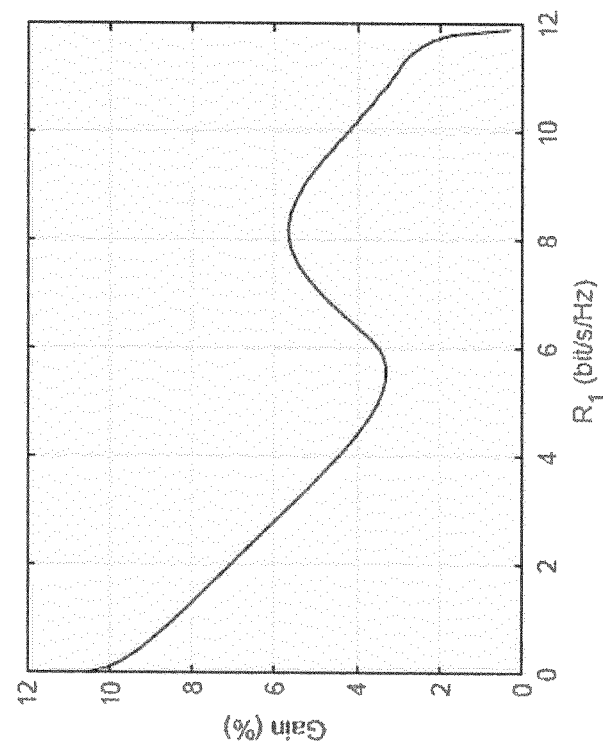
Figure 10:
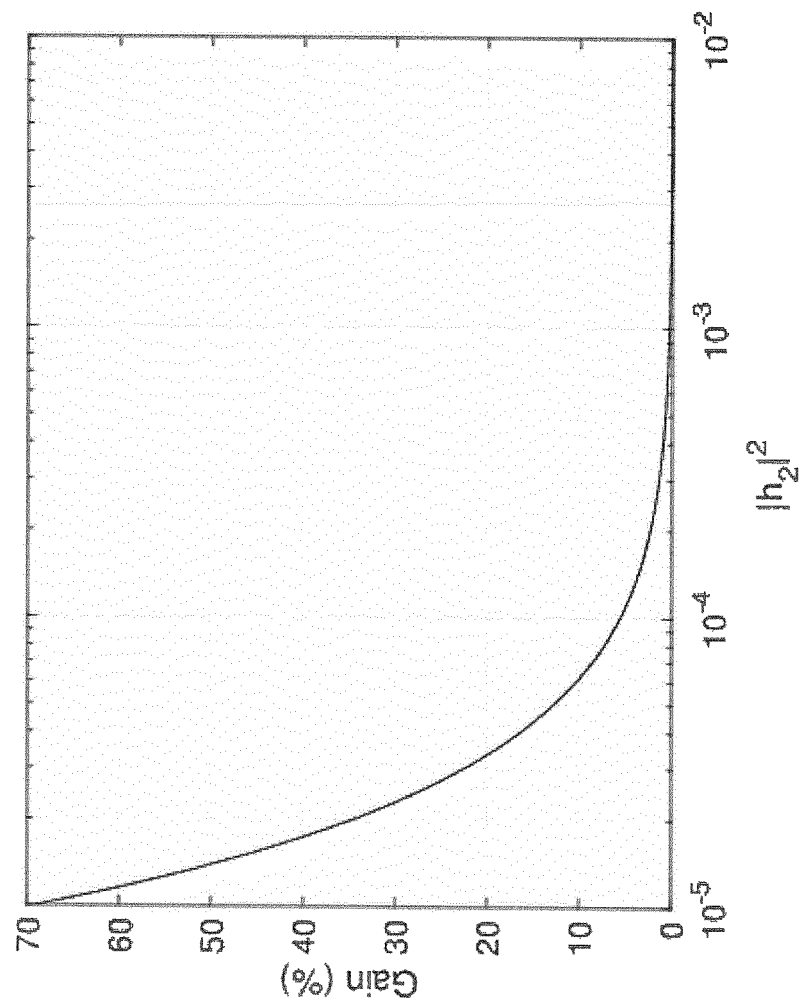

With respect to FIGS. 8 to 10 are shown example simulation results of the system as described herein based on the following system parameters:

$P_T$ (Maximal transmission power of BS)=40 W
$\sigma^2$ (Variance of average white Gaussian noise)=0.1 mW
$|h_1|^2$ (channel link gain between BS and UE 1)=0.01
$|h_2|^2$ (channel link gain between BS and UE 2)=0.0001
$|g|^2$ (channel link gain between UE1 and UE 2)=0.01
$\zeta$ (Energy harvesting efficiency)=0.5

FIG. 8 for example shows achievable rate regions of the three energy harvesting schemes, namely, the scheme as discussed herein 801, a power splitting scheme (i.e., t=0) 803, and the time switching scheme (i.e., $\rho=0$) 805. The conventional NOMA scheme, which has no cooperation phase is also shown 807. In this figure the horizontal axis is the target rate for UE 1, and $R_2$ is obtained by solving problem (P1) numerically for each $R_1(=r)$. As can be seen from FIG. 8, the cooperative schemes outperform conventional NOMA and the plot of power splitting scheme 803 matches the example embodiment generalized scheme 801 as discussed above. Both of them are better than time switching scheme 805 with the improvement being more obvious when $R_1$ is small.

With respect to FIG. 9 a plot of the performance gain in $R_2$ of the example embodiments scheme over conventional NOMA. Under this specification, the largest gain is around 10%. And when $R_1$ is too large, there is no gain at all. From FIG. 9 it can be seen that the gain does not decrease all the way when $R_1$ increases. Instead, it oscillates up and down before going to zero. A target rate for UE 1 can be set to around 8 to achieve the local maximum, which is a good trade-off between R1 and R2, whereas R1 in the leftmost part of the figure is too low although the gain on R2 is high.

With respect to FIG. 10 a plot of the gain of the example embodiments scheme over conventional NOMA and the channel condition of UE 2 from BS. FIG. 10 shows the result. In this it is shown that when the channel between the BS and UE 2 is totally blocked, the only way to reach UE 2 is by relaying through UE 1. Wherefore, for the conventional NOMA without cooperative transmission, UE 2 cannot be reached when $|h_2|^2=0$. The proposed scheme becomes extremely important. In addition, when $|h_2|^2$ is as good as $|h_1|^2$ and $|g|^2$ cooperative transmission is less dominant as the main source of data. In practice, it often occurs that some devices are blocked by obstacles or under poor channel condition. One advantage of the example embodiments scheme is that other devices that are not being blocked can serve as relays to help the BS to reach those devices and reduce user outage probability. Note that when the above scenario does not happen, the energy harvesting scheme falls back into conventional NOMA, which means it may not cost unnecessary extra energy consumption and the data rate of UE 1 will not be jeopardized. In other words, the cooperative transmission and energy harvesting is turned on when necessary and off when not needed.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising circuitry configured for:
controlling transmission from the apparatus to at least two user equipment within a communications system, wherein the circuitry is further configured for:
controlling transmission of data signals for one of the at least two user equipment for a first slot of a direct transmission phase from the apparatus to the at least two user equipment within the communications system, such that:
the one of the at least two user equipment is configured to receive and decode the data signals; and
at least one other of the at least two user equipment is configured to receive and harvest energy from the data signals for relaying data signals to the one of the at least two user equipment for a cooperative transmission phase;
controlling transmission of data signals for both the one of the at least two user equipment and at least one other of the at least two user equipment for a second slot of a direct transmission phase from the apparatus to the at least two user equipment within the communications system, such that:
the at least one other of the at least two user equipment is configured to receive and split the data signals into two parts comprising:
a first part from which the at least one other of the at least two user equipment is configured to harvest energy for relaying data signals to the one of the at least two user equipment; and
a second part from which the at least one other of the at least two user equipment is configured to decode data for the at least one other of the at least two user equipment and decode data for relaying in the cooperative transmission phase data signals to the one of the at least two user equipment using the harvested energy,
wherein the circuitry is further configured for obtaining values for the first slot and the second slot of the direct transmission phase, and at least one of:
determining a time parameter t for defining a length of the first slot and the second slot of the direct transmission phase based on measured communication pathway parameters between the apparatus, the one of the at least two user equipment and at least one other of the at least two user equipment;
determining a portion parameter ρ for defining the first part from which the at least one other of the at least two user equipment is configured to harvest energy for relaying data signals to the one of the at least two user equipment, and for defining the second part from which the at least one other of the at least two user equipment is configured to decode data for the at least one other of the at least two user equipment and decode data for relaying in the cooperative transmission phase data signals to the one of the at least two user equipment using the harvested energy based on measured communication pathway parameters between the apparatus, the one of the at least two user equipment and at least one other of the at least two user equipment;
jointly determining the time parameter and the portion parameter based on measured communication pathway parameters between the apparatus, the one of the at least two user equipment and at least one other of the at least two user equipment; or
receiving the time parameter and the portion parameter from a further apparatus.

2. The apparatus as claimed in claim 1, wherein the circuitry is further configured for controlling non-orthogonal multiple access transmission of data signals for both the one of the at least two user equipment and at least one other of the at least two user equipment.

3. An apparatus comprising circuitry configured for:
receiving, from an access point for a first slot of a direct transmission phase, data signals for a further apparatus:
harvesting energy from the data signals for relaying data signals to the further apparatus in a cooperative transmission phase;
receiving, from the access point for a second slot of a direct transmission phase, data signals for both the further apparatus and the apparatus;
splitting the data signals for both the further apparatus and the apparatus into two parts;
harvesting energy from a first part of the two parts of the received data signals for both the further apparatus and the apparatus for relaying data signals to the further apparatus in a cooperative transmission phase;
decoding from a second part of the two parts of the received data signals for both the further apparatus and the apparatus data for the apparatus and for the further apparatus; and
relaying, in the cooperative transmission phase following the direct transmission phase, to the further apparatus the decoded data for the further apparatus using the harvested energy from the first slot and second slots,
wherein the circuitry is further configured for obtaining values for the first slot and the second slot of the direct transmission phase, and at least one of:
determining a time parameter t for defining a length of the first slot and the second slot of the direct transmission phase based on measured communication pathway parameters between the apparatus, one of at least two user equipment and at least one other of the at least two user equipment;

determining a portion parameter p for defining the first part from which the at least one other of the at least two user equipment is configured to harvest energy for relaying data signals to the one of the at least two user equipment, and for defining the second part from which the at least one other of the at least two user equipment is configured to decode data for the at least one other of the at least two user equipment and decode data for relaying in the cooperative transmission phase data signals to the one of the at least two user equipment using the harvested energy based on measured communication pathway parameters between the apparatus, the one of the at least two user equipment and at least one other of the at least two user equipment;

jointly determining the time parameter and the portion parameter based on measured communication pathway parameters between the apparatus, the one of the at least two user equipment and at least one other of the at least two user equipment; or receiving the time parameter and the portion parameter from a further apparatus.

4. The apparatus as claimed in claim 3, wherein the circuitry for receiving, from the access point for a second slot of a direct transmission phase, data signals for both the further apparatus and the apparatus, is further configured for receiving non-orthogonal multiple access signals, and the circuitry is further configured for system interference cancelling the non-orthogonal multiple access signals.

5. The apparatus as claimed in claim 3, wherein the circuitry for determining the a time parameter t and a portion parameter p based on measured communication pathway parameters between the apparatus, the further apparatus and an access point, is further configured for jointly determining the time parameter t and portion parameter ρ based on measured communication pathway parameters between the apparatus, the further apparatus and an access point.

6. The apparatus as claimed in claim 3, wherein a duration of the cooperative transmission phase following the direct transmission phase is substantially the same as a duration of the second slot of the direct transmission phase.

7. The apparatus as claimed in claim 3, wherein the circuitry for determining the a time parameter t and a portion parameter ρ based on measured communication pathway parameters between the apparatus, the further apparatus and an access point is further configured for jointly determining the time parameter t and portion parameter ρ based on measured communication pathway parameters between the apparatus, the further apparatus and an access point.

8. An apparatus comprising circuitry configured for:
receiving, from an access point for a first slot of a direct transmission phase, data signals for the apparatus;
decoding the first slot of a direct transmission phase data signals;
receiving, from the access point for a second slot of a direct transmission phase, data signals for both the apparatus and a further apparatus;

receiving, from the further apparatus in a cooperative transmission phase following the direct transmission phase, data signals for the apparatus;
combining the data signals for both the apparaths and a further apparatus from the access point and data signals for the apparatus from the further apparatus; and
decoding the combined data signals,
wherein the circuitry is further configured for obtaining values for the first slot and the second slot of the direct transmission phase, and at least one of:
determining a time parameter t for defining a length of the first slot and the second slot of the direct transmission phase based on measured communication pathway parameters between the apparatus, the one of at least two user equipment and at least one other of the at least two user equipment;
determining a portion parameter ρ for defining the first part from which the at least one other of the at least two user equipment is configured to harvest energy for relaying data signals to the one of the at least two user equipment, and for defining the second part from which the at least one other of the at least two user equipment is configured to decode data for the at least one other of the at least two user equipment and decode data for relaying in the cooperative transmission phase data signals to the one of the at least two user equipment using the harvested energy based on measured communication pathway parameters between the apparatus, the one of the at least two user equipment and at least one other of the at least two user equipment;
jointly determining the time parameter and the portion parameter based on measured communication pathway parameters between the apparatus, the one of the at least two user equipment and at least one other of the at least two user equipment; or
receiving the time parameter and the portion parameter from a further apparatus.

9. The apparatus as claimed in claim 8, wherein the circuitry for receiving, from the access point for a second slot of a direct transmission phase, data signals for both the further apparatus and the apparatus, is further configured for receiving non-orthogonal multiple access signals, and the circuitry for receiving, from the further apparatus in a cooperative transmission phase following the direct transmission phase, data signals for the apparatus is further configured for receiving data signals using an out-of-band channel.

10. The apparatus as claimed in claim 8, wherein circuitry for combining the data signals for both the apparatus and a further apparatus from the access point and data signals for the apparatus from the further apparatus is further configured for maximum-ratio combining.

11. The apparatus as claimed in claim 8, wherein a duration of the cooperative transmission phase following the direct transmission phase is substantially the same as a duration of the second slot of the direct transmission phase.

* * * * *